(12) United States Patent
Naito et al.

(10) Patent No.: US 11,715,083 B2
(45) Date of Patent: Aug. 1, 2023

(54) MERCHANDISE DATA REGISTRATION DEVICE AND METHOD

(71) Applicant: TOSHIBA TEC KABUSHIKI KAISHA, Tokyo (JP)

(72) Inventors: Hidehiro Naito, Mishima Shizuoka (JP); Atsushi Miyashima, Izunokuni Shizuoka (JP); Toshihiro Kaneko, Izunokuni Shizuoka (JP); Taiki Tanihira, Izunokuni Shizuoka (JP); Shinsuke Yajima, Mishima Shizuoka (JP); Yuki Kawaguchi, Tagata Shizuoka (JP); Masaki Ito, Numazu Shizuoka (JP); Takahiro Saitou, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/543,588

(22) Filed: Dec. 6, 2021

(65) Prior Publication Data

US 2022/0261783 A1 Aug. 18, 2022

(30) Foreign Application Priority Data

Feb. 18, 2021 (JP) .................................. 2021-024402

(51) Int. Cl.
*G06Q 20/20* (2012.01)
*G06Q 20/18* (2012.01)
*G06K 7/14* (2006.01)

(52) U.S. Cl.
CPC ........... *G06Q 20/208* (2013.01); *G06Q 20/18* (2013.01); *G06Q 20/202* (2013.01); *G06K 7/1413* (2013.01)

(58) Field of Classification Search
CPC .... G06Q 20/208; G06Q 20/18; G06Q 20/202; G06K 7/1413; G07G 1/01; G07G 1/0045
See application file for complete search history.

(56) References Cited

U.S. PATENT DOCUMENTS 5,083,638 A 1/1992 Schneider
5,965,861 A 10/1999 Addy et al.
(Continued)

FOREIGN PATENT DOCUMENTS

EP 2575111 A1 4/2013
JP 2019-71030 A 5/2019

OTHER PUBLICATIONS

R. Bobbit, J. Connell, N. Haas, C. Otto, S. Pankanti and J. Payne, "Visual item verification for fraud prevention in retail self-checkout," 2011 IEEE Workshop on Applications of Computer Vision (WACV), 2011, pp. 585-590. (Year: 2011).*

(Continued)

*Primary Examiner* — Nathan A Mitchell
(74) *Attorney, Agent, or Firm* — Kim & Stewart LLP (57) ABSTRACT

A self-service point-of-sale (POS) terminal for a customer to register a commodity to be purchased in a store, includes an input device, a reading device configured to read a symbol on a commodity, a network interface configured to receive, from an external device operated by a store clerk or the like, instruction information that instructs output of caution information, and a processor. The processor is configured to acquire commodity information about a commodity based on the symbol read by the reading device and register the commodity using the commodity information. Upon receipt of an input of completion of registration via the input device, the processor determines whether to proceed to payment (Continued)

processing for the registered commodity based on whether the instruction information has been received from the external device.

12 Claims, 6 Drawing Sheets

(56) References Cited

U.S. PATENT DOCUMENTS

| | | | |
|---|---|---|---|
| 6,047,262 A | 4/2000 | Lutz | |
| 6,155,486 A | 12/2000 | Lutz | |
| 6,354,498 B1 | 3/2002 | Lutz | |
| 6,408,279 B1 | 6/2002 | Mason | |
| 6,571,218 B1* | 5/2003 | Sadler | G06Q 20/20 705/16 |
| 8,462,212 B1* | 6/2013 | Kundu | G07G 1/0081 348/150 |
| 8,570,375 B1* | 10/2013 | Srinivasan | H04N 7/181 235/383 |
| 9,589,433 B1* | 3/2017 | Thramann | G07G 3/003 |
| 10,192,208 B1* | 1/2019 | Catoe | G07G 1/0054 |
| 10,628,954 B1* | 4/2020 | McCauley | G06V 10/40 |
| 2003/0126019 A1* | 7/2003 | Taylor | G06Q 20/202 705/21 |
| 2005/0033643 A1* | 2/2005 | Smith | G06Q 30/0238 705/16 |
| 2007/0255665 A1* | 11/2007 | Oosugi | G07G 1/0054 235/383 |
| 2008/0005036 A1* | 1/2008 | Morris | G01G 23/3735 705/64 |
| 2009/0039164 A1* | 2/2009 | Herwig | G07G 1/14 235/462.41 |
| 2009/0060259 A1* | 3/2009 | Goncalves | G07G 1/12 382/100 |
| 2009/0272801 A1* | 11/2009 | Connell, II | G06Q 10/087 235/383 |
| 2010/0059589 A1* | 3/2010 | Goncalves | G08B 13/248 382/218 |
| 2011/0210168 A1 | 9/2011 | Haibara | |
| 2014/0176719 A1* | 6/2014 | Migdal | G08B 13/19613 348/150 |
| 2017/0132882 A1 | 5/2017 | Susaki et al. | |
| 2018/0096567 A1* | 4/2018 | Farrow | G07G 3/003 |
| 2019/0066081 A1 | 2/2019 | Yamazaki | |
| 2020/0234056 A1* | 7/2020 | Pricochi | G06V 40/28 |
| 2021/0049575 A1* | 2/2021 | Widmaier | G06Q 20/208 |

OTHER PUBLICATIONS

Extended European Search Report dated Jun. 9, 2022, in corresponding European Patent Application No. 22150152.1, 8 pages.

* cited by examiner

MERCHANDISE DATA REGISTRATION DEVICE AND METHOD

CROSS-REFERENCE TO RELATED APPLICATION

This application is based upon and claims the benefit of priority from Japanese Patent Application No. 2021-024402, filed Feb. 18, 2021, the entire contents of which are incorporated herein by reference.

FIELD

Embodiments described herein relate generally to a merchandise data registration device, a method carried out thereby, and a monitoring system including a merchandise data registration device.

BACKGROUND

In recent years, self-service Point-Of-Sales (POS) terminals have become more widely used in stores such as supermarkets and convenience stores due to labor shortages. Such self-service POS terminals perform operations related to merchandise registration on commodities to be purchased by customers and payment for the registered commodities. In addition, cart POS terminals, each having a scanner, have been installed on shopping carts for performing merchandise registration during movement about the store or the like.

Since merchandise registration is performed by the customers with these self-service POS terminals or cart POS terminals, fraudulent behavior by the customers may occur. For example, if payment is completed without full merchandise registration by a customer, the correct total price of merchandise will not be paid. In order to prevent such a fraud, a store clerk (hereinafter, referred to as "attendant") monitors the customers through a camera, or the like, and if a suspicious behavior is detected, the attendant approaches the customer to give a warning and encourage the customer to perform merchandise registration properly.

However, since approaching and giving a warning to a customer may make the customer uncomfortable even if there is a suspicious behavior, it is difficult for the attendant to take such measures in many cases, and thus the effect of suppressing the fraudulent behavior by the customer may be insufficient.

DETAILED DESCRIPTION

One embodiment provides a merchandise data registration device and a method performed thereby that are highly effective to prevent fraudulent behavior by customers who are allowed to perform merchandise registration by themselves.

In general, according to one embodiment, a self-service point-of-sale (POS) terminal for a customer to register a commodity to be purchased in a store, includes an input device, a processor, a reading device configured to read a symbol on a commodity, a network interface configured to receive instruction information from an external device, that instructs the output of caution information. The processor is configured to: upon reading of a symbol attached to or printed on a commodity by the reading device, acquire commodity information about the commodity based on the read symbol and register the commodity using the commodity information, and upon receipt of an input of completion of registration via the input device, determine whether to proceed to payment processing on the registered commodity based on whether the instruction information has been received from the external device.

Hereinafter, a merchandise data registration device and a method according to certain example embodiments are described with reference to the drawings. The embodiments are not limited to the ones described below. In the example embodiments described below, the merchandise data registration device is a self-service POS terminal that performs operations for merchandise registration and payment by a customer. However, the merchandise data registration device can be any type of device such as a cart POS terminal with which the customer performs merchandise registration during shopping.

Figure 1:
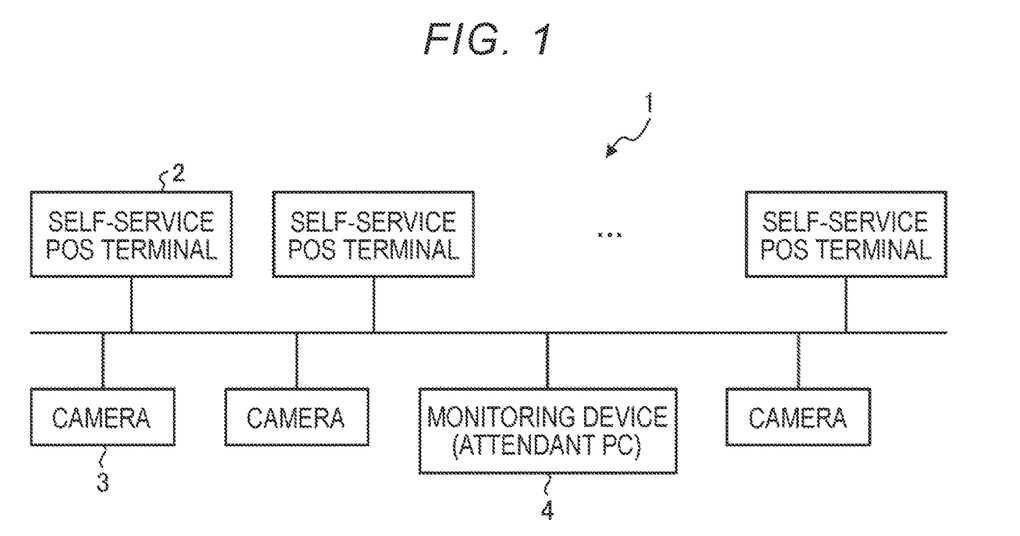
FIG. 1 is a diagram illustrating a monitoring system including a merchandise data registration device according to an embodiment.

FIG. 1 is a diagram illustrating a monitoring system 1 including self-service POS terminals 2 according to an embodiment. The monitoring system 1 is used in a store such as a supermarket. The monitoring system 1 includes self-service POS terminals 2, cameras 3, and an attendant PC (Personal Computer) 4 as illustrated in FIG. 1. The attendant PC 4 services as a monitoring device in this context. The self-service POS terminals 2, the cameras 3, and the attendant PC 4 are communicably connected to each other, for example, via a Local Area Network (LAN) or the like.

Each self-service POS terminal 2 performs merchandise registration on purchase target commodities to be purchased by a customer and a payment process relating to payment for the registered commodities according to operations by the customer. In the description below, the process of merchandise registration performed by the customer may be referred to as a registration operation, and a payment process performed by the customer may be referred to as a payment operation.

Here, merchandise registration refers to a process of registering or storing commodity information for each item being purchased. For example, the merchandise registration is a process of registering commodity information such as a commodity name and its price based on input identification information such as a commodity code. The payment process is a process relating to payment of the price of the commodity subjected to the merchandise registration. For example, the payment process is a process of calculating and displaying the total price due in the transaction (the amount due), calculating and displaying the change due, and providing a change dispense instruction to a change dispenser 56 and a receipt dispense instruction to a printer 54, or the like.

The cameras 3 are provided near the self-service POS terminals 2. Each camera 3 captures a video of a customer who is performing a registration operation or a payment operation using one of the self-service POS terminals 2, and outputs the video data (or other image data) to the attendant PC 4. If the merchandise data registration device is a cart POS terminal, the camera 3 may be installed on the shopping cart itself, or a plurality of cameras 3 may be provided in the store so that the entire sales floor of the store can be monitored.

The attendant PC 4 is a PC operated by an attendant sales clerk or the like. If an error occurs in a self-service POS terminal 2, the attendant PC 4 receives information indicating the corresponding error. The attendant then goes to the location of the self-service POS terminal 2 where the error occurs and takes required measures.

The attendant PC 4 displays the video data received from a camera 3 on its display. The attendant can look at the video displayed on the attendant PC 4 and monitor the customer who is performing the registration operation and the payment operation to check if the customer does fraudulent behavior. Examples of the fraudulent behavior include: bagging an item of merchandise commodity without registering the item, reducing the total price due by repeating merchandise registration on a cheap item instead of registering an expensive item that will be removed from the store so that the total number of items registered by the customer will still match the number of items being removed from the store by the customers, and the like.

If it is determined that there is a suspicious behavior during a registration operation or a payment operation by a customer, the attendant operates the attendant PC 4 to output instruction information to the self-service POS terminal 2 where the suspicious behavior occurs. The instruction information is to instruct the self-service POS terminal 2 to output a notification encouraging the customer to perform correct merchandise registration (hereinafter, referred to as caution information to an individual customer). The instruction information can be information indicating that appears to be a likeliness that there has been fraudulent behavior by a customer.

The attendant PC 4 may be a desktop PC disposed near the self-service POS terminals 2, or may be a tablet-type PC that can be carried by the attendant. In some examples, the attendant PC 4 may detect suspicious behavior according to a machine learning based model, estimation process, or the like using video data received from the camera 3 and then automatically output instruction information based on the detection result.

Figure 2:
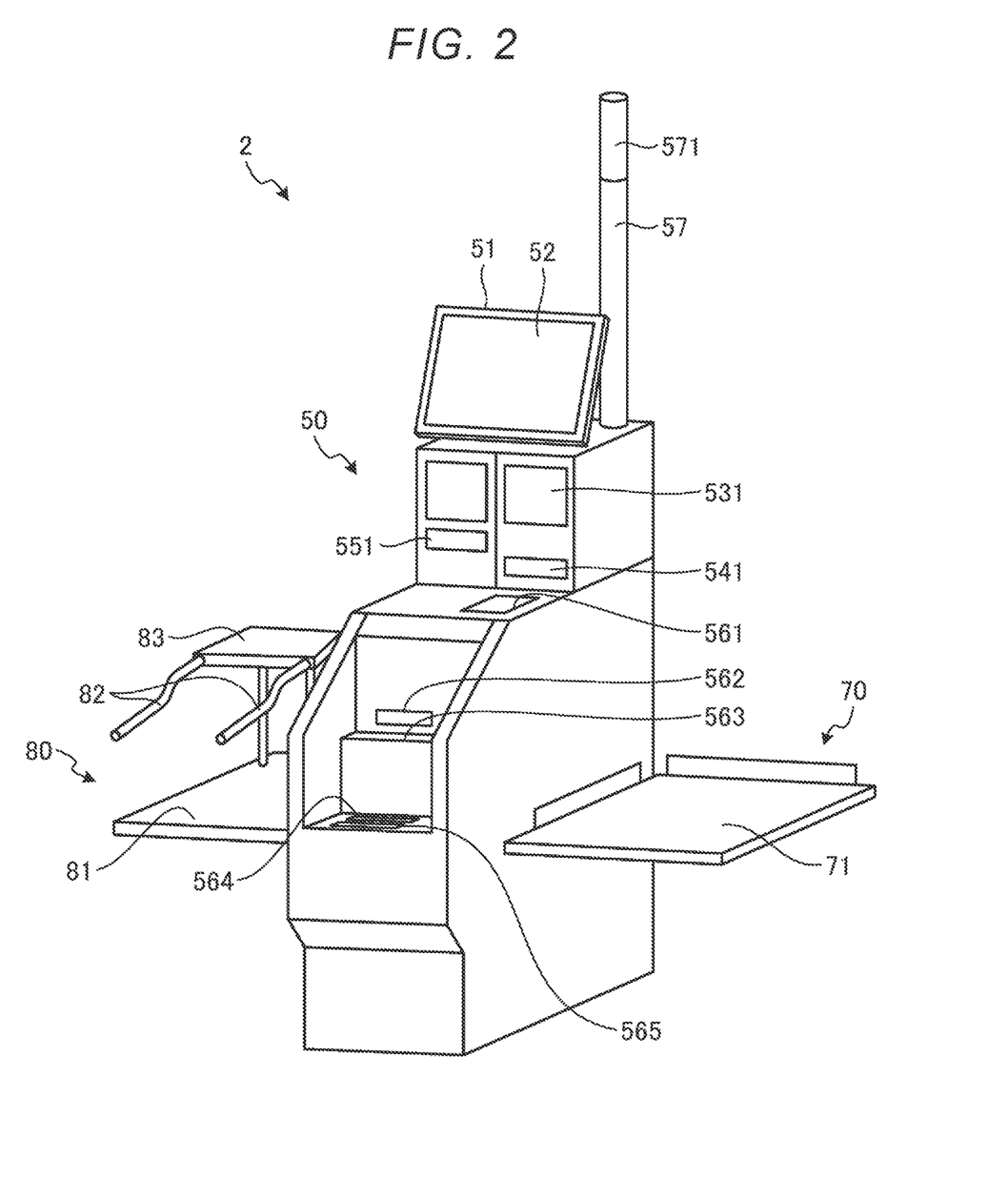
FIG. 2 depicts an appearance of a merchandise data registration device.

FIG. 2 is a diagram illustrating an appearance of the self-service POS terminal 2. As illustrated in FIG. 2, the self-service POS terminal 2 includes a main body 50, a first mounting table 70, and a second mounting table 80.

The main body 50 includes a display 51 and a touch panel 52 on the upper portion and houses a scanner 53, the printer 54, a card reader 55, and the change dispenser 56 (see FIG. 3) inside thereof.

The display 51 is a display device such as a Liquid Crystal Display (LCD) and displays various kinds of information. For example, the display 51 displays commodity information such as a commodity name, a price, and the like of a commodity subjected to merchandise registration performed by a customer according to his or her registration operation. The display 51 displays payment information such as a total price, change, or the like of the transaction according to the payment operation of the customer.

Further, the display 51 displays information encouraging the customer to perform merchandise registration correctly based on instruction information received from the attendant PC 4. This information may indicate the likeliness that merchandise registration is not performed correctly. The information may be output as a voice sound through a speaker embedded in the display 51.

Specifically, the display 51 displays a message, for example, "The clerk is coming, please wait", based on the instruction information from the attendant PC 4. Accordingly, the customer who seems likely to engage in fraud is notified that the clerk may be checking registered commodities and the customer is thus encouraged to perform merchandise registration correctly. Based on the instruction information from the attendant PC 4, the display 51 displays a message that requests the customer to confirm whether merchandise registration has correctly been performed and a user interface (UI) component such as a button for the customer to make the confirmation. For example, a text message "Have all merchandises been registered?", a "Yes" button, and a "No" button are displayed. Accordingly, the customer is encouraged to perform merchandise registration correctly by requiring the customer to confirm the merchandise registration. The message displayed on the display 51 may be a message for directly encouraging the customer to perform merchandise registration correctly, for example, "There is a commodity that has not been registered. Please register the commodity correctly."

Figure 3:
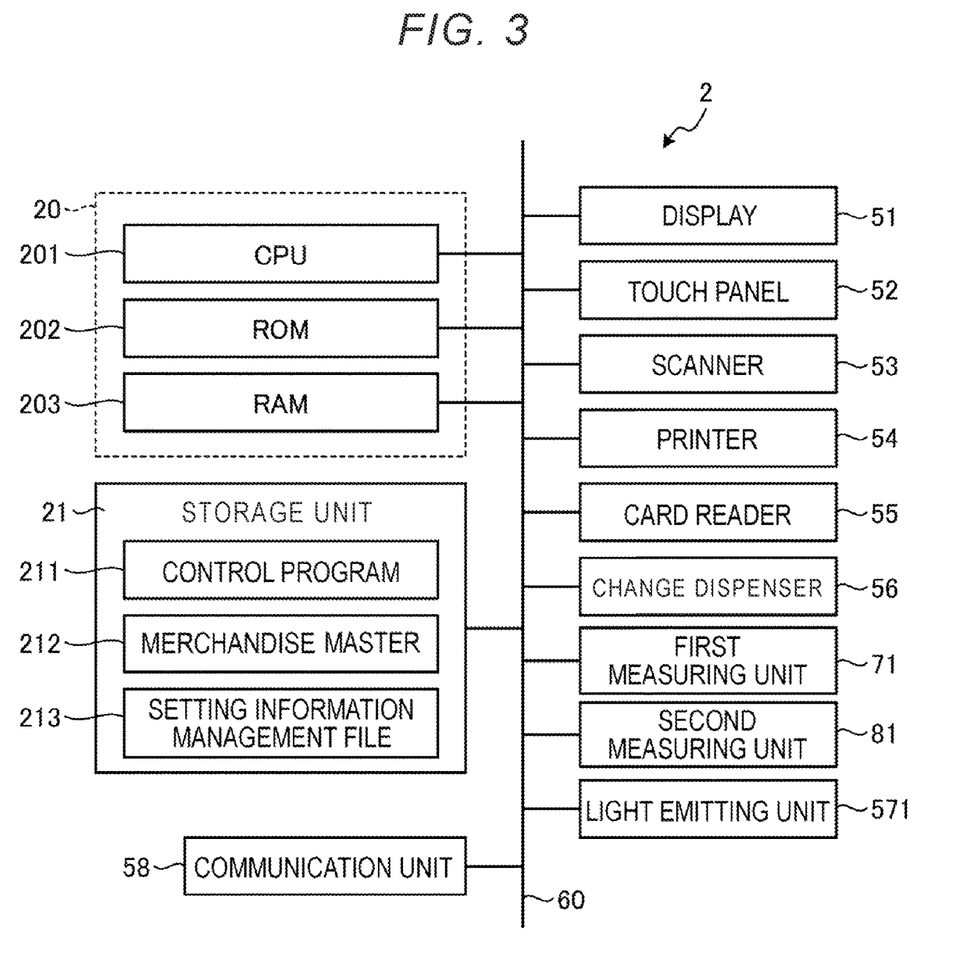
FIG. 3 is a hardware block diagram of a merchandise data registration device.

The touch panel 52 is an operation unit that is provided on the surface of the display 51 for a customer to input an operation, and outputs information according to the contact position to the control unit 20 of the self-service POS terminal 2 (see FIG. 3). The customer who is using the self-service POS terminal 2 can operate various buttons or operation keys displayed on the display 51.

As illustrated in FIG. 2, below the display 51, towards the direction in which the customer is positioned, a reading window 531 of the scanner 53, a dispensing slot 541 of a receipt printed by the printer 54, and a card insertion slot 551 of the card reader 55 are formed.

The reading window 531 is a window for the scanner to read a barcode or the like attached to a commodity. When the scanner 53 optically reads a barcode, laser light is emitted from the scanner 53 through the reading window 531. The dispensing slot 541 is an opening for ejecting a receipt printed by the printer 54. The card insertion slot 551 is an opening for inserting a credit card or the like that is a reading target of the card reader 55.

Corresponding to the position of the change dispenser 56 stored inside, a coin insertion slot 561, a coin ejection slot 562, a coin tray 563, a bill insertion slot 564, and a bill ejection slot 565 are formed in the main body 50.

The coin insertion slot 561 is an opening for enabling the customer to insert coins to be paid. The coins inserted to the coin insertion slot 561 are stored in the change dispenser 56. The coin ejection slot 562 is an opening for ejecting coins dispensed from the change dispenser 56. The coin ejection slot 562 ejects coins. The coins that have been inserted from the coin insertion slot 561 but have not received by the change dispenser 56 are also ejected from the coin ejection slot 562. The coin tray 563 is a tray that receives the coins ejected from the coin ejection slot 562. The bill insertion slot 564 is an opening for a customer to insert bills to be paid. The bills that have been inserted to the bill insertion slot 564 are stored in the change dispenser 56. The bill ejection slot 565 is an opening for ejecting the bills dispensed from the change dispenser 56.

The first mounting table 70 is a mounting table on which a shopping basket containing commodities to be purchased by a customer can be mounted. The first mounting table 70 includes a first measuring unit 71. The first measuring unit 71 is a weight sensor or a scale that measures a total weight of the shopping basket mounted on the first mounting table 70 along with the commodities contained therein.

The second mounting table 80 is a mounting table on which a shopping basket or bag containing commodities which have been registered by the customer (for example, the barcodes on the items have been read by the scanner 53) can be mounted or placed. The second mounting table 80 includes a second measuring unit 81, a pair of support rods 82, and a temporary placing table 83.

The second measuring unit 81 is a weight sensor or a scale that measures a total weight of the shopping basket placed on the second mounting table 80 along with the commodities contained therein, or a total weight of a shopping bag supported by the pair of support rods 82 and commodities contained therein. The support rods 82 are rods for hooking and supporting a shopping bag containing registered commodities. The support rods 82 enable the registered commodities to be easily inserted into the shopping bag by supporting the shopping bag in an open state. The temporary placing table 83 is a table for temporarily placing a commodity that is easily broken or deformed, for example, tofu or eggs, among the commodities that have been registered. The customer can put the commodity on the temporary placing table 83 into the shopping basket or bag after the other registered commodities have been stored therein.

The customer performs merchandise registration by positioning a commodity that has been taken out from the shopping basket on the first mounting table 70 in front of the reading window 531 and, for example, causing a barcode attached to the commodity to be read by the scanner 53. The customer stores the commodity of which merchandise registration is completed in the shopping basket mounted on the second mounting table 80 or the shopping bag supported by the support rods 82.

A control unit 20 (see FIG. 3) recognizes a weight change by controlling the first measuring unit 71 to measure weights before and after the commodity is taken out from the shopping basket mounted on the first mounting table 70. The control unit 20 further recognizes a weight change by controlling the second measuring unit 81 to measure weights before and after the merchandise is stored in the shopping basket mounted on the second mounting table 80 or the shopping bag supported by the support rods 82. The control unit 20 can determine whether the customer has correctly performed merchandise registration of the commodity to be purchased based on whether both weight changes are the same.

The main body 50 includes a columnar pole 57 extending from the upper portion thereof. A light emitting unit 571 that emits light if the attendant is called is provided at the upper tip portion of the pole 57.

FIG. 3 is a hardware block diagram of the self-service POS terminal 2. The self-service POS terminal 2 includes the control unit 20, a storage unit 21, the display 51, the touch panel 52, the scanner 53, the printer 54, the card reader 55, the change dispenser 56, the first measuring unit 71, the second measuring unit 81, the light emitting unit 571, and a communication unit 58. The control unit 20, the storage unit 21, the display 51, the touch panel 52, the scanner 53, the printer 54, the card reader 55, the change dispenser 56, the first measuring unit 71, the second measuring unit 81, the light emitting unit 571, and the communication unit 58 are connected to each other via a bus 60 or the like.

The control unit 20 includes a processor such as a Central Processing Unit (CPU) 201, a Read Only Memory (ROM) 202, and a Random Access Memory (RAM) 203. The CPU 201, the ROM 202, and the RAM 203 are connected to each other via the bus 60.

The CPU 201 controls the entire operations of the self-service POS terminal 2. The ROM 202 stores various programs executed by the CPU 201 and various kinds of data. The RAM 203 is used as a work area of the CPU 201 and temporarily stores various programs and various kinds of data loaded from the ROM 202 or the storage unit 21. The control unit 20 performs various control processes of the self-service POS terminal 2 according to one or more control programs stored in the ROM 202 or the storage unit 21 and loaded onto the RAM 203.

The storage unit 21 includes a storage medium such as a Hard Disk Drive (HDD) or a flash memory and maintains the stored programs and data even if the power is cut off. Specifically, the storage unit 21 stores a control program 211, a merchandise master 212, and a setting information management file 213.

The control program 211 is a control program for performing the functions of the self-service POS terminal 2 and a portion of the functions of the monitoring system 1. The merchandise master 212 is a master file storing a plurality of commodity codes and commodity information (such as a merchandise name and a price) with respect to commodities sold by a store in a correlating manner. The commodities dealt by the store are changed day by day, and thus the merchandise master 212 can be appropriately updated by a server connected via the communication unit 58.

Figure 4:
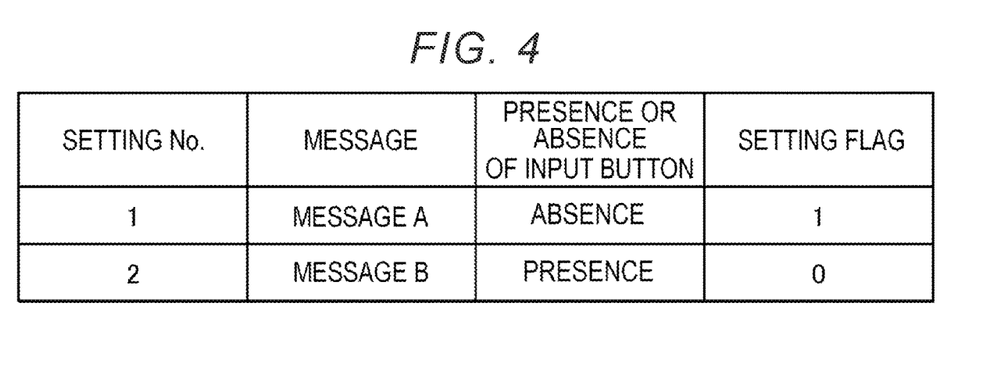
FIG. 4 depicts a data structure of a notification information file stored in a merchandise data registration device.

The setting information management file 213 is to manage setting information relating to the process of the self-service POS terminal 2 if a suspicious behavior of a customer is found. FIG. 4 depicts a data structure of the setting information management file 213. The setting information management file 213 stores a plurality of records, each including a setting number, a message, information indicating presence and absence of an input button, and a setting flag.

The setting number is a number for specifying setting information of a process of the self-service POS terminal 2 if a suspicious behavior of a customer is found. Specifically, the setting number is a number for specifying a process if the self-service POS terminal 2 receives instruction information from the attendant PC 4. The message is information indicating a message to be displayed. In the present embodiment, a message A indicates "The clerk is coming, please wait", and a message B indicates "Have all the merchandises been registered?". The information that indicates presence and absence of an input button is information whether to display an input button for a customer to operate together with the message. The setting flag is information for indicating the corresponding process is enabled if instruction information is received from the attendant PC 4. In the example illustrated in FIG. 4, when instruction information is received from the attendant PC 4, only the process specified by Setting No. 1 in which "1" is registered in the record of the setting flag is performed. Specifically, the message A corresponding to "1" of the record of the setting flag is displayed. The setting flag is registered by a clerk of the store where the self-service POS terminal 2 is installed, or the like and rewritten as required. In this example, only one of the processes shown in FIG. 4 is enabled, that is, only one of the setting flags is set to "1".

The description refers back to FIG. 3. The configurations and the functions of the display 51 and the touch panel 52 are as described above.

The scanner 53 optically reads and recognizes a code symbol such as a barcode attached to a commodity to be purchased by the customer. The scanner 53 decodes the code symbol and reads a commodity code indicated by the code symbol. The code symbol that has been read by the scanner 53 may be decoded by the control unit 20 of the self-service POS terminal 2. The scanner 53 may have a function of recognizing a commodity by an object recognizing method based on a feature amount of the commodity such as color or unevenness.

The printer 54 is, for example, a thermal printer. The printer 54 prints information relating to a transaction on a sheet of roll-shaped receipt paper and dispenses the sheet from the dispensing slot 541 as a receipt.

The card reader 55 magnetically reads credit card information required for payment from a credit card that has been inserted into the card insertion slot 551. The card reader 55 magnetically reads member information for specifying a member from a medium such as a member card or a point card that has been inserted into the card insertion slot 551. The card reader 55 may be an IC card reader that reads information from an IC card including an Integrated Circuit (IC) chip.

If a customer pays the purchase price of commodities in cash, the change dispenser 56 receives bills and/or coins paid by the customer and then dispenses the change due as required. The bills are inserted into the bill insertion slot 564, and the coins are inserted into the coin insertion slot 561. When the change is dispensed, bills are ejected from the bill ejection slot 565, and coins are ejected from the coin ejection slot 562.

The functions of the first measuring unit 71, the second measuring unit 81, and the light emitting unit 571 are as described above. The communication unit 58 is a network interface circuit configured to communicate with the attendant PC 4 or an external device such as a server managed by the store.

Figure 5:
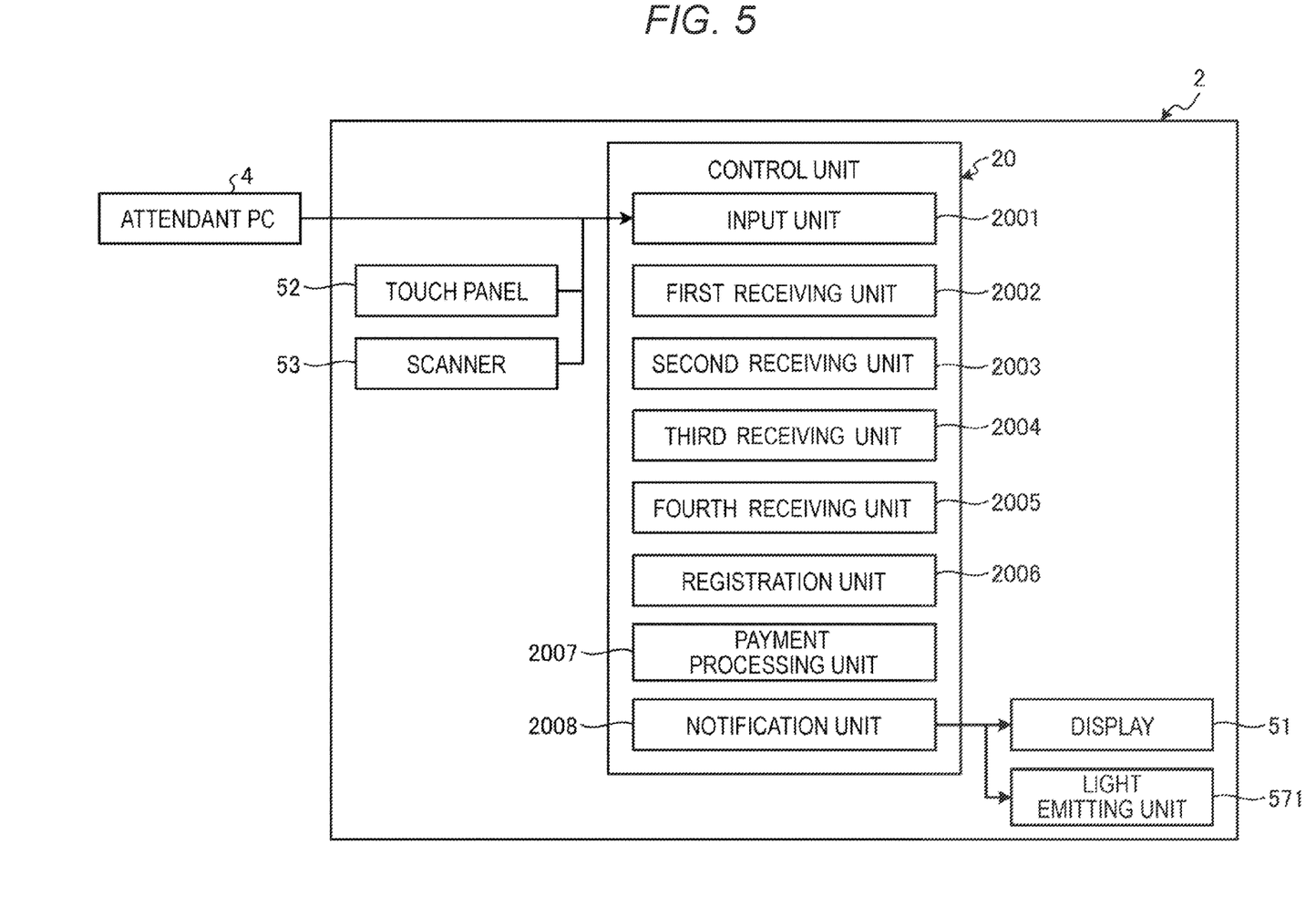
FIG. 5 is a functional block diagram of a merchandise data registration device.

Hereinafter, a functional configuration of the self-service POS terminal 2 is described. FIG. 5 is a functional block diagram of the control unit 20 of the self-service POS terminal 2. The CPU 201 of the control unit 20 performs the functions of an input unit 2001, a first receiving unit 2002, a second receiving unit 2003, a third receiving unit 2004, a fourth receiving unit 2005, a registration unit 2006, a payment processing unit 2007, and a notification unit 2008, according to the control program stored in the ROM 202 or the storage unit 21. One or more of the functions may be performed by hardware other than the CPU 201 such as a dedicated circuit.

Various kinds of information are input from the attendant PC 4, the touch panel 52, and the scanner 53 to the input unit 2001. For example, instruction information for instructing notification for encouraging the customer to perform merchandise registration correctly is input from the attendant PC 4 to the input unit 2001. The instruction information is input to the input unit 2001 by an operation of the attendant PC 4 if the attendant monitors an operation of a customer directly or by a video captured by the camera 3 and there is a suspicious behavior by the customer.

The registration completion information indicating that the merchandise registration in one transaction is completed is input from the touch panel 52 to the input unit 2001. The registration completion information is input from the touch panel 52 to the input unit 2001 by a touch operation by a customer who has completed the merchandise registration on an operation button displayed on the display (see D of FIG. 7).

Further, a clerk code for identifying a clerk is input from the scanner 53 to the input unit 2001. The clerk code is input to the input unit 2001, for example, by causing the scanner 53 to scan a barcode printed on a name plate of the clerk. The clerk code is identification information for identifying the clerk.

The information indicating whether merchandise registration has correctly been performed is input from the touch panel 52 to the input unit 2001. For example, that information is input by the customer touching the input button displayed on the display 51.

Another information is also input to the input unit 2001. For example, a commodity code for identifying a commodity is input via the scanner 53 when a customer causes the barcode attached to the commodity to be read by the scanner 53.

The first receiving unit 2002 receives the instruction information that has been input from the attendant PC 4 instructing the notification of caution information for a customer. Specifically, the first receiving unit 2002 receives the instruction information that has been input from the attendant PC 4 to the input unit 2001.

The second receiving unit 2003 receives registration completion information that has been input from the touch panel 52 and indicating the completion of the merchandise registration in one transaction. Specifically, the second receiving unit 2003 receives registration completion information that has been input from the touch panel 52 to the input unit 2001.

The third receiving unit 2004 receives identification information for identifying a clerk. Specifically, the third receiving unit 2004 receives a clerk code that has been input from the touch panel 52 or the scanner 53 to the input unit 2001.

The fourth receiving unit 2005 receives information indicating whether merchandise registration has correctly been performed. Specifically, the fourth receiving unit 2005 receives information that has been input to the input unit 2001 and indicating whether merchandise registration has correctly been performed.

The registration unit 2006 performs merchandise registration on commodities to be purchased according to an operation by a customer. Specifically, the registration unit 2006 reads from the merchandise master 212 commodity information corresponding to the commodity code that has been input to the input unit 2001 and stores the commodity information in the RAM 203. The commodity information is information including a commodity code, a commodity name, a price, and the like.

The payment processing unit 2007 performs a payment process relating to a payment of the prices of commodities that have been registered by the registration unit 2006. Specifically, the payment processing unit 2007 calculates the total price of the registered commodities, calculates the change, outputs various kinds of information for display, and issues a receipt. If the customer desires cashless payment such as credit card payment or two-dimensional code payment (e.g., voucher payment), the payment processing unit 2007 can perform the payment process according to the designated payment method.

If the second receiving unit 2003 receives registration completion information, the payment processing unit 2007 performs the payment process on the condition that the first receiving unit 2002 has not received any instruction information. For example, if "1" is set to the setting flag corresponding to Setting No. 1 in the setting information management file 213, the payment processing unit 2007 performs the payment process as follows. That is, if the second receiving unit 2003 receives registration completion information, but also the first receiving unit 2002 receives instruction information, the payment processing unit 2007 does not perform the payment process until the third receiving unit 2004 receives a clerk code.

If "1" is set to the setting flag corresponding to Setting No. 2 in the setting information management file 213, the payment processing unit 2007 performs the payment process as below. If the second receiving unit 2003 receives registration completion information, and the first receiving unit 2002 also receives instruction information, the payment processing unit 2007 does not perform the payment process until the fourth receiving unit 2005 receives an input indicating that merchandise registration has correctly been performed.

If the first receiving unit 2002 receives instruction information, the notification unit 2008 performs a notification based on the instruction information even if the second receiving unit 2003 receives registration completion information. Specifically, if the first receiving unit 2002 receives instruction information, the notification unit 2008 performs a display for encouraging the customer to perform merchandise registration correctly with the display 51 when the second receiving unit 2003 receives registration completion information.

Figure 6:
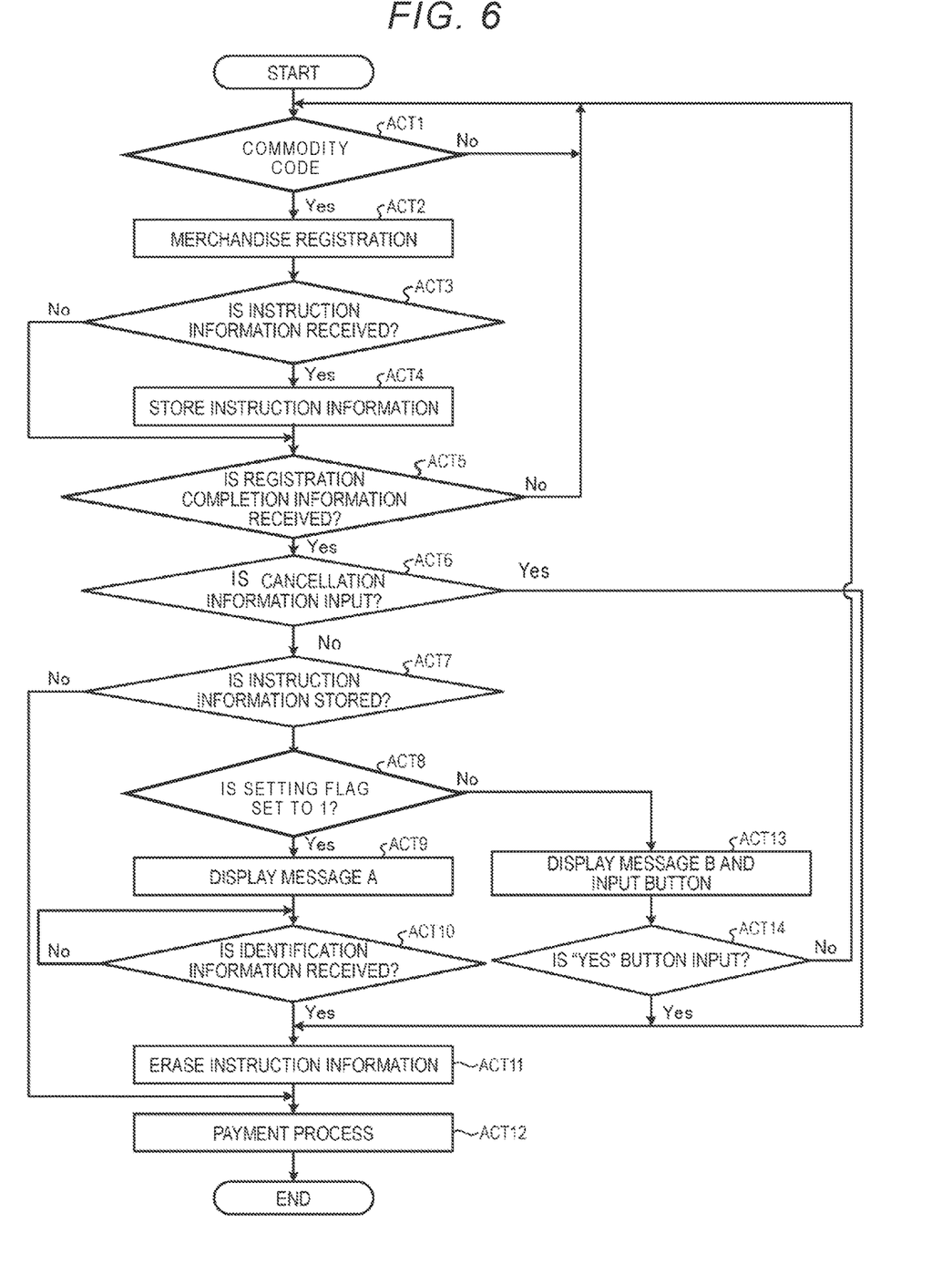
FIG. 6 is a flowchart of a process performed by a merchandise data registration device.

Hereinafter, an operation of the self-service POS terminal 2 having the above configuration is described. FIG. 6 is a flowchart of a process performed by the control unit 20 of the self-service POS terminal 2.

First, the control unit 20 determines whether a commodity code is input to the input unit 2001 (Act 1). In other words, the control unit 20 determines whether the scanner 53 reads a commodity code from a barcode attached to a commodity. If the commodity code is not input (No in Act 1), the control unit 20 returns to the process of Act 1 and stands by.

If the commodity code is input to the input unit 2001 (Yes in Act 1), the registration unit 2006 performs merchandise registration based on the input commodity code (Act 2). At this point, a registration screen indicating commodity information of the registered commodity is displayed on the display 51. Subsequently, the control unit determines whether the first receiving unit 2002 has received instruction information (Act 3). In other words, the control unit 20 determines whether instruction information has been input from the attendant PC 4 to the input unit 2001. If instruction information has been received (Yes in Act 3), the control unit 20 stores the received instruction information in the RAM 203 (Act 4).

Subsequently, the control unit 20 determines whether the second receiving unit 2003 has received registration completion information (Act 5). In other words, the control unit 20 determines whether registration completion information has been input from the touch panel 52 to the input unit 2001. If registration completion information has not been received (No in Act 5), the control unit 20 returns to the process of Act 1.

If registration completion information has been received (Yes in Act 5), the control unit 20 determines whether cancellation information has been input to the input unit 2001 (Act 6). That is, the control unit 20 determines whether cancellation of instruction information has been input to the input unit 2001 during a period after the first receiving unit 2002 received the instruction information until the second receiving unit 2003 received the registration completion information.

If cancellation information has not been input (No in Act 6), the control unit 20 determines whether the instruction information is stored in the RAM 203 (Act 7). That is, the control unit 20 checks whether it is required to notify the customer of caution information. In the process of Act 3, if the first receiving unit 2002 has not received any instruction information (No in Act 3), the control unit 20 skips the process of Act 4 and proceeds to the process of Act 5.

Figure 7:
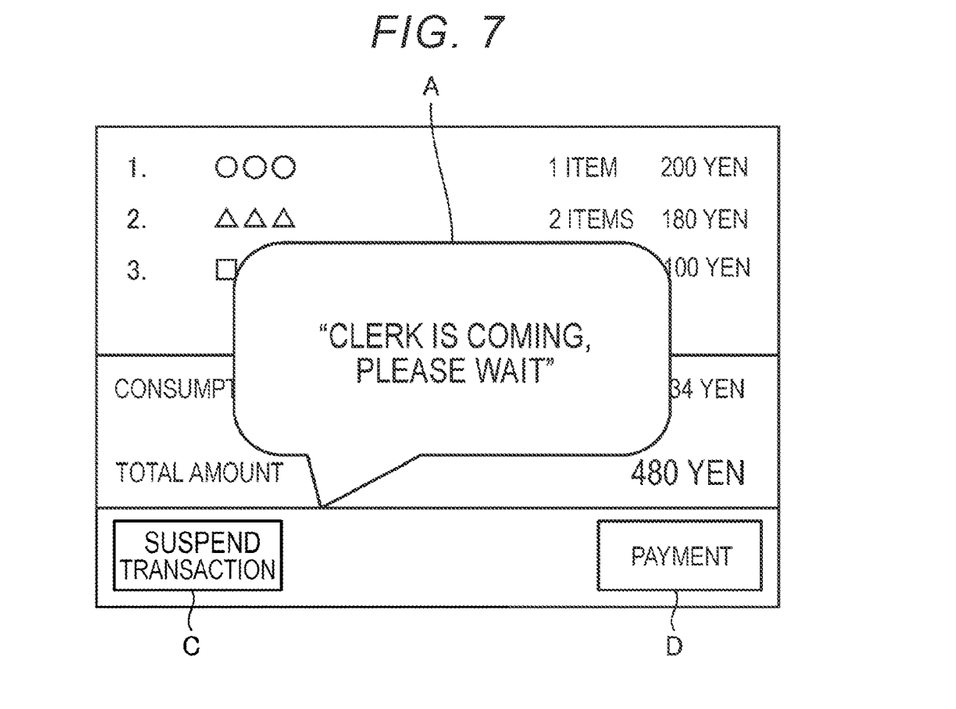
FIG. 7 and FIG. 8 each depict examples of a display screen for merchandise data registration.

If instruction information is stored (Yes in Act 7), the control unit 20 determines whether the setting flag of the setting information specified by Setting No. 1 is set to "1" (Act 8). That is, the control unit 20 refers to the setting information management file 213 and determines whether "1" is set the setting flag corresponding to Setting No. 1. If the setting flag is set to "1" (Yes in Act 8), the notification unit 2008 controls the display 51 to display the message A (Act 9). As illustrated in FIG. 7, the message "The clerk is coming, please wait" is displayed in a pop-up window on the registration screen on the display 51. At this point, the control unit 20 also causes the light emitting unit 571 to emit light to call an attendant. In FIG. 7, a reference sign C denotes an operation button for suspending the transaction, and a reference sign D denotes an operation button for completing the merchandise registration and shifting to the payment. If the operation button D is touched, the registration completion information is input to the input unit 2001.

Subsequently, the control unit 20 determines whether the third receiving unit 2004 has received identification information (Act 10). In other words, the control unit 20 determines whether a clerk code has been read from a barcode of a name card of an attendant by the scanner 53. If identification information has not been received (No in Act 10), the control unit 20 returns to the process of Act 10 and stands by until the third receiving unit 2004 receives the identification information. That is, the control unit 20 stands by until the reading of a clerk code by the scanner 53, which is performed after the attendant checks commodities to be purchased by the customer.

If identification information has been received (Yes in Act 10), the control unit 20 erases the instruction information stored in the RAM 203 (Act 11). If the identification information has been input in the process of Act 10, the control unit 20 determines that the attendant has confirmed that merchandise registration has correctly been performed by the customer, and erases the instruction information. The payment processing unit 2007 performs the payment process (Act 12), and the control unit 20 ends the process.

In the process of Act 6, if cancellation information has been input (Yes in Act 6), the control unit 20 proceeds to the process of Act 11. If an attendant observes a customer's suspicious behavior and then confirms that merchandise registration has correctly been performed before declaring completion of the merchandise registration, the attendant inputs the cancellation information from the attendant PC 4 to the input unit 2001. In such a case, the payment process is performed without a display of encouraging the customer to perform merchandise registration correctly.

If instruction information is not stored in the RAM 203 (No in Act 7), the control unit 20 proceeds to the process of Act 12. In the circumstance that instruction information is not input from the attendant PC 4 to the input unit 2001, if the second receiving unit 2003 receives the registration completion information, the payment processing unit 2007 immediately performs the payment process.

Figure 8:
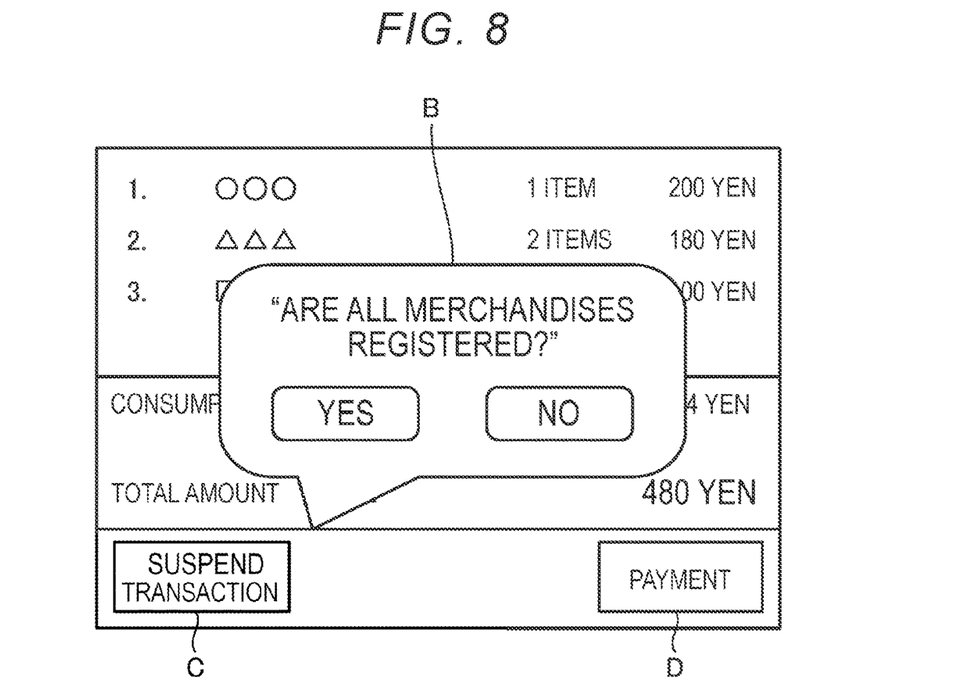

In the process of Act 8, if the setting flag of the setting information specified by Setting No. 1 is not set to "1" (No in Act 8), that is, if the setting flag of the setting information specified by Setting No. 2 is set to "1", the notification unit 2008 controls the display 51 to display the message B and an input button (Act 13). Accordingly, as illustrated in FIG. 8, the message "Are all merchandises registered?", a "Yes"

button, and a "No" button are displayed in the pop-up window in the registration screen on the display 51. The "Yes" button and the "No" button are UI components for receiving an input indicating whether merchandise registration has correctly been performed.

Subsequently, the control unit 20 determines whether information indicating that the "Yes" button has been operated has been input to the input unit 2001 (Act 14). That is, the control unit 20 determines whether the fourth receiving unit 2005 has received information indicating that the merchandise registration has correctly been performed. If the information indicating that the "Yes" button has been operated has not been input (No in Act 14), the control unit 20 returns to the process of Act 1. If the information indicating that the "Yes" button has been operated has been input (Yes in Act 14), the control unit 20 proceeds to the process of Act 11.

According to the above process, if instruction information for notifying a customer of caution information, in other words, information indicating that it is likely that there is a fraudulent behavior of the customer is input from the attendant PC 4, the self-service POS terminals 2 issues the notification using the display 51 as below.

If the setting flag of the setting information specified by Setting No. 1 is set to "1", the notification unit 2008 controls the display 51 to display the display screen illustrated in FIG. 7. Accordingly, checking of the registered commodities by the clerk is notified to the customer who may have engaged in fraud, the customer is encouraged to perform merchandise registration correctly. If the setting flag of the setting information specified by Setting No. 2, the notification unit 2008 controls the display 51 to display the display screen illustrated in FIG. 8. Accordingly, by requiring the customer who may have engaged in fraud to check merchandise registration with respect to all commodities, the customer is encouraged to perform merchandise registration correctly. Therefore, it is possible to make the customer aware that the fraud check is being performed, so that the effect of suppressing fraudulent behavior can be improved. In addition, since it is not required that the attendant approaches the customer, the giving of an uncomfortable feeling to the customer can be reduced.

The notification unit 2008 performs the display in the condition that the second receiving unit 2003 has received registration completion information. In other words, the notification unit 2008 does not perform the above display until the second receiving unit 2003 receives registration completion information. Therefore, after a suspicious behavior was found, if the customer performs merchandise registration correctly before declaring the completion of the merchandise registration, the display of encouraging the customer to perform merchandise registration correctly is not performed. Therefore, the display is performed only when it is necessary, and the giving of an uncomfortable feeling to the customer can be reduced.

As described above, the self-service POS terminal 2 according to the present embodiment includes a registration unit 2006 that performs merchandise registration on commodities according to a customer's operations, and a first receiving unit 2002 that receives instruction information that is input from the attendant PC 4 for instructing the self-service POS terminal 2 to notify the customer of caution information. The self-service POS terminal 2 further includes a second receiving unit 2003 that receives registration completion information that is input from a touch panel 52 and indicates that the merchandise registration of commodities in a transaction has been completed, and a notification unit 2008 that performs notifications based on the instruction information when the second receiving unit 2003 receives the registration completion information after the first receiving unit 2002 receives the instruction information.

Accordingly, the self-service POS terminal 2 can make the customer aware that a fraud check may be performed while reducing uncomfortable feelings for an innocent customer. Therefore, the suppressing effect on the fraudulent behavior can be improved.

The self-service POS terminal 2 according to the present embodiment further includes a payment processing unit 2007 that performs the payment process relating to the payment of the prices of commodities that have been registered by the registration unit 2006 so long as the first receiving unit 2002 has not received the warning instruction information when the second receiving unit 2003 receives the registration completion information.

Accordingly, the self-service POS terminal 2 can simply perform the payment process if it is not suspected that there is any fraudulent behavior. Therefore, the payment process can be prevented from being performed based on fraudulent merchandise registrations and the like.

Further, the self-service POS terminal 2 according to the present embodiment further includes a third receiving unit 2004 that receives a clerk code for identifying a clerk. If the second receiving unit 2003 receives the registration completion information, and the first receiving unit 2002 also receives the warning instruction information, the payment processing unit 2007 performs the payment process only after the third receiving unit 2004 receives the clerk code.

Accordingly, if there is a suspicion that there has been fraudulent behavior, the self-service POS terminal 2 can delay performing of the payment process until after the clerk checks that merchandise registration has been performed correctly by the customer. Therefore, it is possible to more surely prevent the payment process from being performed based on a fraudulent merchandise registration.

In addition, if the second receiving unit 2003 receives registration completion information, and the first receiving unit 2002 receives warning instruction information, the self-service POS terminal 2 according to the present embodiment displays a message for requesting the customer to perform an input indicating whether merchandise registration has correctly been performed and a button for receiving the input on the display 51.

Accordingly, if there is a suspicion of fraudulent behavior, the self-service POS terminal 2 can cause the customer to input that the merchandise registration has correctly been performed. Therefore, the customer can be encouraged to perform merchandise registration correctly, and fraud behavior can be further reduced.

In addition, the self-service POS terminal 2 according to the present embodiment further includes a fourth receiving unit 2005 that receives information input from the touch panel 52 indicating whether the merchandise registration has correctly been performed. The payment processing unit 2007 performs the payment process only after that the fourth receiving unit 2005 receives input indicating that the merchandise registration has correctly been performed.

Accordingly, if there is a suspicion of fraudulent behavior, the self-service POS terminal 2 can perform the payment process only after the customer's confirmation that merchandise registration has correctly been performed. Therefore, it is possible to more surely prevent the payment process from being performed based on a fraudulent merchandise registration.

In the above embodiments, the control programs executed by the self-service POS terminal 2 and the attendant PC 4 may be recorded in a computer-readable recording medium such as CD-ROM and copied therefrom. The control programs executed by the self-service POS terminal and the attendant PC 4 may be stored in a computer connected via a network such as the Internet and downloaded via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-service point-of-sale (POS) terminal for a customer to register a commodity to be purchased in a store, comprising:
   a display device;
   an input device;
   a reading device configured to read symbols on commodities;
   a network interface configured to receive, from an external device, instruction information instructing the POS terminal to display a message related to a potential fraudulent behavior by the customer; and
   a processor configured to:
     store in a memory a flag indicating whether payment processing can be performed without an input of a clerk code when the instruction information is received from the external device during registration;
     upon reading of a symbol on a commodity by the reading device, acquire commodity information about the commodity based on the symbol and register the commodity using the commodity information; and
     upon receipt of an input of completion of registration via the input device,
       when the instruction information has not been received from the external device, proceed to payment processing on the registered commodity, and
       when the instruction information has been received from the external device,
         control the display device to display a first message and a button to proceed to the payment processing on the registered commodity when the flag indicates that payment processing can be performed without an input of a clerk code, and
         control the display device to display a second message different from the first message without the button, and proceed to the payment processing on the registered commodity in response to an input of a clerk code, when the flag indicates that payment processing cannot be performed without an input of a clerk code.

2. The POS terminal according to claim 1, wherein the second message indicates that a store clerk is coming.

3. The POS terminal according to claim 1, wherein a popup window over a registration screen on which the commodity information about the registered commodity is shown is used to display the first or second message.

4. The POS terminal according to claim 1, wherein the first message asks whether the customer has correctly registered the commodity.

5. The POS terminal according to claim 4, wherein the processor is further configured to, when the button is operated, proceed to the payment processing.

6. The POS terminal according to claim 1, further comprising:
   a lamp, wherein
   the processor is further configured to turn on the lamp when the second message is displayed.

7. A method carried out by a self-service point-of-sale (POS) terminal for a customer to register a commodity to be purchased in a store, the method comprising:
   storing in a memory a flag indicating whether payment processing can be performed without an input of a clerk code when instruction information is received from an external device during registration, the instruction information instructing the POS terminal to display a message related to a potential fraudulent behavior by the customer;
   upon reading of a symbol on a commodity by a reading device, acquiring commodity information about the commodity based on the read symbol and registering the commodity using the commodity information; and
   upon receipt of an input of completion of registration via an input device,
     when the instruction information has not been received from the external device, proceeding to payment processing on the registered commodity, and
     when the instruction information has been received from the external device,
       displaying a first message and a button to proceed to the payment processing on the registered commodity when the flag indicates that payment processing can be performed without an input of a clerk code, and
       displaying a second message different from the first message without the button, and proceeding to the payment processing on the registered commodity in response to an input of a clerk code, when the flag indicates that payment processing cannot be performed without an input of a clerk code.

8. The method according to claim 7, wherein the second message indicates that a store clerk is coming.

9. The method according to claim 7, wherein a popup window over a registration screen on which the commodity information about the registered commodity is shown is used to display the first or second message.

10. The method according to claim 7, wherein the first message asks whether the customer has correctly registered the commodity.

11. The method according to claim 10, wherein when the button is operated, the payment processing is performed.

12. A monitoring system for monitoring customers in a retail store, comprising:
    one or more cameras installed in the store;
    a monitoring device operated by a store clerk and configured to display an image captured by each of the cameras; and
    a point-of-sale (POS) terminal for a customer to register a commodity to be purchased in the store, including:
      a display device;
      an input device;

a reading device configured to read symbols on a commodities;

a network interface configured to receive, from the monitoring device, instruction information instructing the POS terminal to display a message related to a potential fraudulent behavior by the customer; and a processor configured to:

store in a memory a flag indicating whether payment processing can be performed without an input of a clerk code when the instruction information is received from the monitoring device during registration;

upon reading of a symbol on a commodity by the reading device, acquire commodity information about the commodity based on the symbol and register the commodity using the commodity information; and upon receipt of an input of completion of registration via the input device, when the instruction information has not been received from the monitoring device, proceed to payment processing on the registered commodity, and when the instruction information has been received from the monitoring device, control the display device to display a first message and a button to proceed to the payment processing on the registered commodity when the flag indicates that payment processing can be performed without an input of a clerk code, and control the display device to display a second message different from the first message without the button, and proceed to the payment processing on the registered commodity in response to an input of a clerk code, when the flag indicates that payment processing cannot be performed without an input of a clerk code.

* * * * *